United States Patent
Mataele (10) Patent No.: US 7,674,965 B2
(45) Date of Patent: Mar. 9, 2010

(54) METHOD AND SYSTEM FOR MUSIC NOTATION

(76) Inventor: Victor Mataele, 1253 E. Wild Hay La., Draper, UT (US) 84020

(*) Notice: Subject to any disclaimer, the term of this patent is extended or adjusted under 35 U.S.C. 154(b) by 0 days.

(21) Appl. No.: 12/037,073

(22) Filed: Feb. 25, 2008

(65) Prior Publication Data

US 2008/0202318 A1 Aug. 28, 2008

Related U.S. Application Data

(60) Provisional application No. 60/903,144, filed on Feb. 23, 2007.

(51) Int. Cl.
G09B 15/02 (2006.01)
(52) U.S. Cl. .................................................. 84/483.2
(58) Field of Classification Search ................ 84/483.2
See application file for complete search history.

(56) References Cited

U.S. PATENT DOCUMENTS

| | | | | |
|---|---|---|---|---|
| 6,528 | A * | 6/1849 | Von Heeringen ............ | 84/483.2 |
| 391,887 | A * | 10/1888 | Fallon ........................ | 84/483.2 |
| 608,771 | A * | 8/1898 | Guilford ..................... | 84/471 R |
| 877,911 | A * | 2/1908 | Cross et al. ................ | 84/423 R |
| 1,473,495 | A * | 11/1923 | Miller ........................ | 84/483.2 |
| 6,201,769 | B1 * | 3/2001 | Lewis .......................... | 368/10 |
| 6,288,316 | B1 * | 9/2001 | Fajardo ...................... | 84/483.2 |
| 6,388,181 | B2 * | 5/2002 | Moe ........................... | 84/477 R |
| 6,388,182 | B1 * | 5/2002 | Bermudez ................... | 84/477 R |
| 6,660,921 | B2 * | 12/2003 | Deverich .................... | 84/470 R |
| 6,831,220 | B2 * | 12/2004 | Varme ........................ | 84/483.2 |
| 6,977,334 | B2 * | 12/2005 | Kimbrough ................. | 84/483.1 |
| 6,987,220 | B2 * | 1/2006 | Holcombe .................. | 84/483.2 |
| 7,041,891 | B2 * | 5/2006 | Smith Carter ............... | 84/478 |
| 7,148,414 | B2 * | 12/2006 | Kestenbaum et al. ....... | 84/483.2 |
| 7,241,945 | B1 * | 7/2007 | Egan .......................... | 84/483.2 |
| 7,253,349 | B1 * | 8/2007 | Saltsman ..................... | 84/424 |
| 2002/0117043 | A1 * | 8/2002 | Powley ....................... | 84/483.2 |
| 2002/0178896 | A1 * | 12/2002 | George ....................... | 84/477 R |
| 2008/0127810 | A1 * | 6/2008 | Egan .......................... | 84/483.2 |
| 2008/0202318 | A1 * | 8/2008 | Mataele ...................... | 84/483.2 |
| 2008/0295670 | A9 * | 12/2008 | Egan .......................... | 84/483.2 |

OTHER PUBLICATIONS

Piano Tabs, How to Read Piano Tabs, updated Jun. 2008, 12-key sets referenced by letters, a,A,B,c,C,d,D,e,f,F,g,G, viewed Dec. 5, 2008 at tabnabber.com/documents/howtoreadtabs.asp.*

(Continued)

*Primary Examiner*—Jeffrey Donels
*Assistant Examiner*—Robert W Horn
(74) *Attorney, Agent, or Firm*—Clayton, Howarth & Cannon, P.C.

(57) ABSTRACT

A system and method of notating and teaching music are disclosed. The system and method includes referencing notes and other musical representations using symbols, such as numbers, letters and color. For example, music notation may include at least one set, wherein a single set comprises twelve notes that may be numbered from 1-12, in which the numbers 1-9 may be used for the first nine notes and the letters x, y and z may be used for notes ten through twelve. Each series of twelve notes may be grouped together into a set, identified as "A Set"; "B Set"; "C Set" and so forth.

44 Claims, 7 Drawing Sheets

OTHER PUBLICATIONS

Edvinsson, Peter "Learn To Play Amazing Grace With Piano Tabs." Learn To Play Amazing Grace With Piano Tabs. Apr. 13, 2007. EzineArticles.com. Feb. 6, 2009 <http://ezinearticles.com/?Learn-To-Play-Amazing-Grace-With-Piano-Tabs&id=526413>.*

Music Theory -Chords and Symbols, Intervals of Chords, viewed at library.thinkquest.ort/15413/theory/chords.htm.*

Julius Heinrich Ludwig Schoen, A Proposed Alternative System of Musical Notation, http://www.illuSchoen.net, Mar. 2004.

Julius Heinrich Ludwig Schoen, A Proposed Alternative System of Musical Notation: Addenda to Main Document, http://www.illuSchoen.net, Mar. 2004.

Julius Heinrich Ludwig Schoen, A Proposed Alternative System of Musical Notation: Quick Start Guide, http://www.illuSchoen.net, Mar. 2004.

Julius Heinrich Ludwig Schoen, Alternative System of Musical Notation: Reference Sheet, http://www.illuSchoen.net, Mar. 2004.

* cited by examiner

The Monday Triad of January

1ᴹ  3    5    6    8    X    Z

1ᴹ  3    5         8         The Triad can be switched around or inverted.

5         8    1ᴹ        This is our first inversion.

8    1ᴹ        5    This is our second inversion. There is a third inversion if we have more than a Triad.

METHOD AND SYSTEM FOR MUSIC NOTATION

CROSS-REFERENCE TO RELATED APPLICATIONS

This application claims the benefit of U.S. Provisional Application No. 60/903,144, filed Feb. 23, 2007, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Invention

The present disclosure relates generally to a method and system for notating and teaching music, and more particularly, but not necessarily entirely, to a method and system for notating and teaching music using symbols, such as numbers, letters and colors, to represent notes, durations and other aspects of music notation.

2. Description of Related Art

There are a myriad of different methods and systems known in the industry for notating music and teaching music to others. Despite the advantages known in notating and teaching music in a traditional style, improvements are still being sought. Prior methods of notating and teaching music require a great amount of study and learning and are thus characterized by several disadvantages that may be addressed by the present disclosure. The present disclosure minimizes, and in some aspects eliminates, the failures, and other problems known in traditional methods and systems for notating and teaching music, by utilizing the methods and features described herein.

The features and advantages of the disclosure will be set forth in the description that follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "musical pitch level" refers to a sound or pitch that a particular structure on a musical instrument makes when depressed. For example, when a user depresses a particular key on a standard eighty-eight key piano a sound is ultimately produced by the piano and that sound represents one particular musical pitch level 102.

Applicant has discovered a new method and system for teaching music using symbols to simplify the process of learning notes and other features of reading sheet music and otherwise learning to play music on a musical instrument. Applicant has thus conceived of a useful method and system for teaching music that is simple in operation and relatively easy for a person to learn, which is disclosed in this specification.

For the sake of streamlining the present disclosure and for clarity in disclosing the features of the present disclosure, reference will be made to a particular embodiment, namely a piano. However, it will be appreciated that the principles of the present disclosure may applied to other instruments as well, except drums, including but not necessarily limited to guitars, violins and other stringed instruments, as well as other instruments that may not be a stringed instrument. In other words, the principles of the present disclosure may be applicable to all instruments, without departing from the spirit or scope of the present disclosure.

Figure 1:
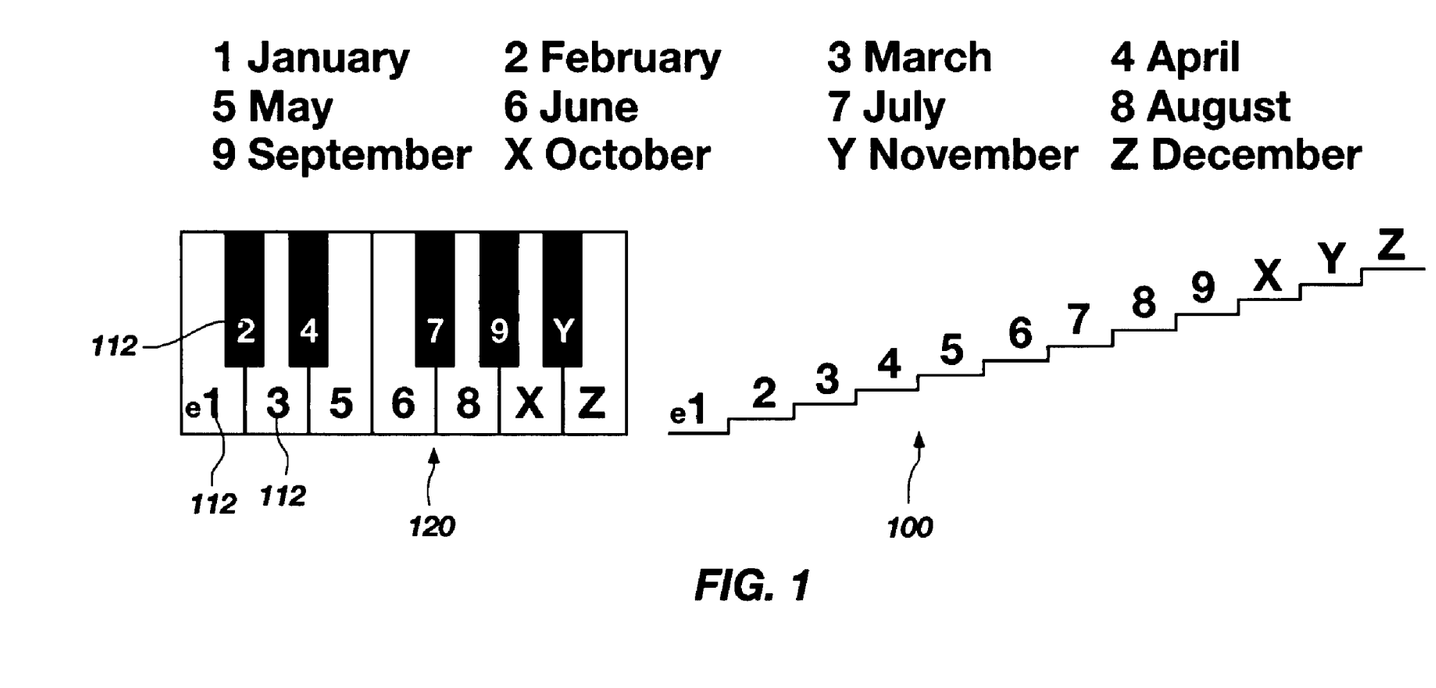
FIG. 1 is a top, schematic view of a musical instrument illustrating a set in accordance with music notation of the present disclosure.
Figure 2:
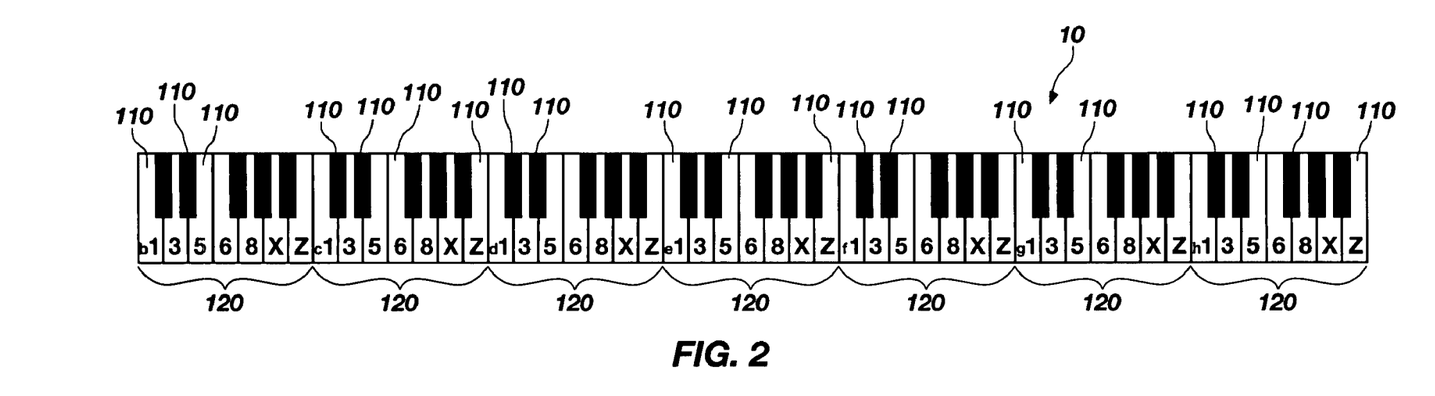
FIG. 2 is a top, schematic view of a musical instrument, such as a piano, illustrating a plurality of sets in accordance with the principles of the present disclosure.

Referring now to FIGS. 1-2, the present disclosure relates generally to a system 10 for displaying or notating musical information for string and other non-string instruments. It will be appreciated that the present disclosure may include various features for system and method of music notation. The present disclosure may include notes or musical pitch levels 100, sets 120, scales 140, positions 160 and a key. As used herein, "musical pitch levels" may refer to both the wavelength and the amplitude of sounds or pitches. It will be appreciated that a short wavelength has a lot of waves and is a high frequency with a high sound. Conversely, a long wavelength has fewer waves than a short wavelength, and has a low frequency and low sound.

Specifically, a plurality of notes or musical pitch levels 100 may grouped together to form a set 120. In one embodiment, a set 120 includes twelve notes or musical pitch levels 100. It will be appreciated that each musical instrument may have a different number of sets 120, but most instruments will have a plurality of sets 120.

Figure 5:
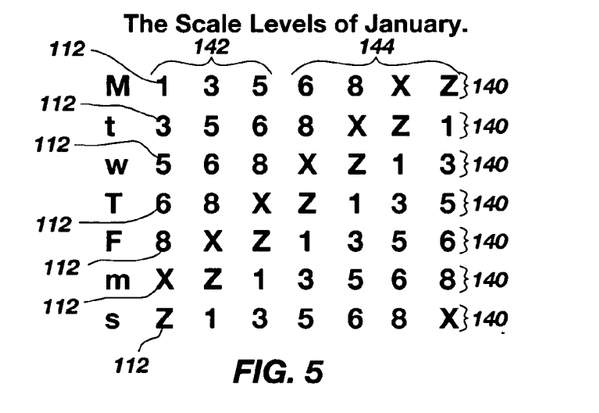
FIG. 5 is an illustration of a scale and scale levels for January in accordance with the principles of the present disclosure.

Referring now to FIG. 5, in general terms, a scale 140 may include less than all of the notes or musical pitch levels 100 in a given set 120, and in one embodiment may include seven notes or musical pitch levels 120 starting with the key note that the song may be based upon. In FIG. 5 the "M" scale, discussed more fully below, begins with Level 1 and includes Levels 1, 3, 5, 6, 8, X and Z.

In order to identify the various notes or musical pitch levels 100 in a given set 120, a unique identifier or symbol 112 may be assigned to each of the plurality of notes or musical pitch levels 100 of a musical instrument, such as a piano or a guitar or other instrument. In one embodiment, each of the twelve notes or musical pitch levels may be assigned a different number between one and twelve, as illustrated in FIG. 1. After the twelve notes or musical pitch levels 100 are numbered in a given set 120, the same can be done for other notes or musical pitch levels 100 to create another set 120, until all of the notes or levels 100 in each of the plurality of sets 120 are numbered, as illustrated in FIG. 2.

It will be appreciated that the unique identifier or symbol 112 for each note or level 100 in a given set 120 may be comprised of letters of the alphabet, a number, or an alphanumeric character, which includes a combination of numbers and letters used together, or some other symbol. Within each set 120, each of the twelve structures 110, such as piano keys or other structural components of a musical instrument that are used to create a particular sound, corresponding to a different musical pitch level 100 in that set 120 may be numbered one through twelve, with the numbers one through nine being used to identify the first nine structures 110 of the instrument, and the letters X, Y and Z being used as the numbers ten through twelve as follows: the letter X may represent the number ten, the letter Y may represent the number eleven, and the letter Z may represent the number twelve, as illustrated in FIG. 1.

Further, each of the alphanumeric symbols may be named, to help identify a particular structure or key using every day names, such as one of the twelve months in a calendar year. Referring to FIGS. 1 and 2, for example, in "Set A" or the set 120 on the far left side of the page in FIG. 2, the numbered structures corresponding to notes or levels 100 may be identified with the calendar month that corresponds with that number as follows:

| | | | |
|---|---|---|---|
| 1 = January | 2 = February | 3 = March | 4 = April |
| 5 = May | 6 = June | 7 = July | 8 = August |
| 9 = September | 10 = October | 11 = November | 12 = December |

In order to identify one set from another, each set in a series of sets may be identified as Set A, Set B, Set C, and so forth, until all sets have been identified. For example, on a standard piano there may be eight sets, labeled "Set A" through "Set H." It will be appreciated that the number of sets may change as the musical instrument changes, and the teaching of the present disclosure are applicable to all instruments, no matter how many sets are present.

Figure 3A:
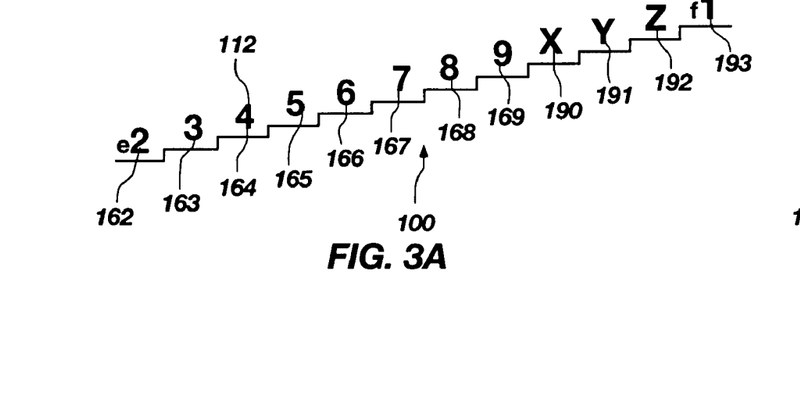
FIG. 3A is an illustration of Set E starting with a low position of 2 and having twelve distinct levels in accordance with the principles of the present disclosure.
Figure 3B:
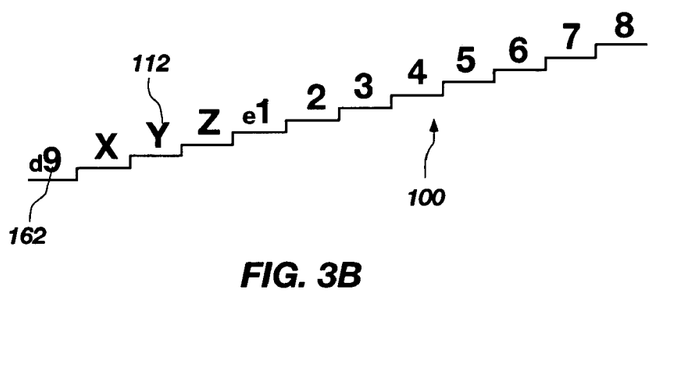
FIG. 3B is an illustration of Set D starting with a low position of 9 and having twelve distinct levels in accordance with the principles of the present disclosure.
Figure 4A:
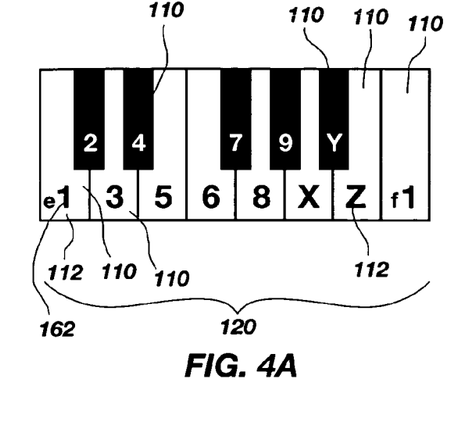
FIGS. 4A and 4B illustrate two different sets as structure on a musical instrument, such as a piano, in accordance with the principles of the present disclosure.
Figure 4B:
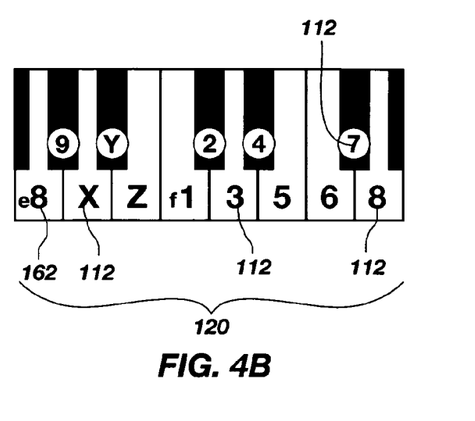

Another feature of the present disclosure is that each of the twelve numbered structures 110 corresponding to notes or levels may include a position 160. Thus, in addition to having a name and a corresponding number, each structure may also have a position 160. Referring now to FIGS. 3A-4B, it will be appreciated that the first structure 110 in a given set 120 may be positioned in a "low" position 162. All other positions may be determined with respect to the low position 162 and each structural position may have a name. Specifically, a position 160 immediately adjacent to the low position 162 is the low position plus one more position, i.e., low plus one, and so forth. For example, the following is a chart of the names of the positions illustrated in FIG. 3A:

a Low is the low position 162;
an Up position 163 is the low position plus one additional position;
a Leap position 164 is the low position plus two additional positions;
a Minor position 165 is the low position plus three additional positions;
a Major position 166 is the low position plus four additional positions;
a Suspended position 167 is the low position plus five additional positions;
a Diminished position 168 is the low position plus six additional positions;
a High position 169 is the low position plus seven additional positions;
an Augmented position 190 is the low position plus eight additional positions;
a Relative Minor position 191 is the low position plus nine additional positions;
a Pull position 192 is the low position plus ten additional positions; and
a Down position 193 is the low position plus eleven additional positions.

It will be appreciated that the set 120 may include all of the levels 100, while a scale 140 may include less than all of the levels 100 in a given set 120. More specifically, a scale 140 may include seven levels 100 of a given set 120. The seven levels of a scale 140 typically start with the key, but it will be appreciated that it is not necessary to begin a scale 140 with the key and instead could begin with another level 100. In any event, the seven levels of the scale 140 may be separated into a first group 142 and a second group 144, as illustrated in FIG. 5.

The first group 142 of the scale 140 may include three levels beginning with the key, or some other level, and may include every other level until three levels are reached. The first group 142 may be comprised of all even numbered levels if the key is an even number level or the first group 142 may be comprised of all odd numbered levels if the key is an odd number level. For example, if a piece of music was being played in the key of February, which is the second month of the year and is an even number that corresponds with the number two or the second level, then the scale 140 would begin with level 2. The scale would include every other even level until three levels are reached, such that the scale would include levels 2, 4 and 6 in that example. In a second example where the key is odd, if the key was September, which is the ninth month of the year and is an odd number that corresponds with the number nine or the ninth level, then the scale would begin with level 9. The scale would include every other odd level until three levels are reached, such that the scale would include levels 9, Y and then starts over to the level 1, in that example.

Turning now to the second group 144 of the scale, the second group may include four levels and each of the four levels are opposite the level numbers of the first group, with respect to being even or odd numbered levels. If the first group is even, then the second group will all be odd numbers and vice versa. Further, the first of the four levels in the second group may begin with the level immediately following the third level of the first group. Similar to the first group, the four levels of the second group may include every other level until four levels are reached. In other words, the second group may be comprised of all even numbered levels if the first group is comprised of all odd numbered levels. Similarly, the second group may be comprised of all odd numbered levels if the first group is comprised of all even numbered levels.

Taking the first example above relating to the first group of levels in the scale, i.e., a piece of music being played in the key of February, and applying the principles above in selecting the second group of the scale, the second group begins with the level 7 because level 7 immediately follows the last level of the first group, which is level 6. The second group of the scale would include every other odd level until four levels are reached, such that the seven levels of the scale would include levels 2, 4 and 6 from the first group and levels 7, 9, Y and 1 in the second group, in that example. In the second example above where the key is September, the second group begins with the level 2, because level 2 immediately follows the last level of the first group, which in this example is level 1. The second group of the scale would include every other even level until four levels are reached, such that the seven levels of the scale would include levels 9, Y and 1 from the first group and levels 2, 4, 6 and 8 in the second group, in that example.

Referring to FIG. 5, each of the seven levels in a given scale 140 may be named based on each of the level's position with respect to the other levels of the scale 140. The first level may be named Monday, the second level may be named Tuesday, the third level may be named Wednesday, the fourth level may be named Thursday, the fifth level may be named Friday, the sixth level may be named Saturday, and the seventh level may be named Sunday. As an alternative embodiment, the names of the levels may be Monday through Sunday as described above, with the exception of Saturday, which may be changed to SaturMIKE, where the letters "MI" represent Minor and the letters "KE" represent Key. Thus, SaturMIKE notation may represent a Minor Key in the Saturday position.

As illustrated in FIG. 5, "M" may represent Monday, meaning the Leader (Key) of the Active Players of the scale;

"t" may represent Tuesday, meaning the second Active Player of the scale;

"w" may represent Wednesday, meaning the third Active Player of the scale;

"T" may represent Thursday, meaning the fourth Active Player of the scale;

"F" may represent Friday, meaning the fifth Active Player of the scale;

"m" may represent Saturday or satur-mike, meaning the sixth Active Player of the scale; and "s" may represent Sunday, meaning the seventh Active Player of the scale.

The names of the positions of the scale 140 may identify the active players or active structures of the scale 140 that a user actually plays to make the sound of that particular piece of music.

It will be appreciated that each of the twelve notes or levels 100, identified as January through December, may have seven scale levels and each of the seven scales may generally follow a specific pattern. For example, as illustrated in FIG. 5, the note or level of January may have the following seven scale levels or scale positions, which may be named according to their order as follows:

| "M" | 1 | 3 | 5 | 6 | 8 | X | Z |
| "t" | 3 | 5 | 6 | 8 | X | Z | 1 |
| "w" | 5 | 6 | 8 | X | Z | 1 | 3 |
| "T" | 6 | 8 | X | Z | 1 | 3 | 5 |
| "F" | 8 | X | Z | 1 | 3 | 5 | 6 |
| "m" | X | Z | 1 | 3 | 5 | 6 | 8 |
| "s" | Z | 1 | 3 | 5 | 6 | 8 | X |

It will be appreciated that the same chart of seven scales can be made for each of the twelve notes identified as January through December. It will be appreciated that the names of the months and the names of the days of the week are used because they are readily identified by a number and easy to remember for a new music student.

Figure 6:
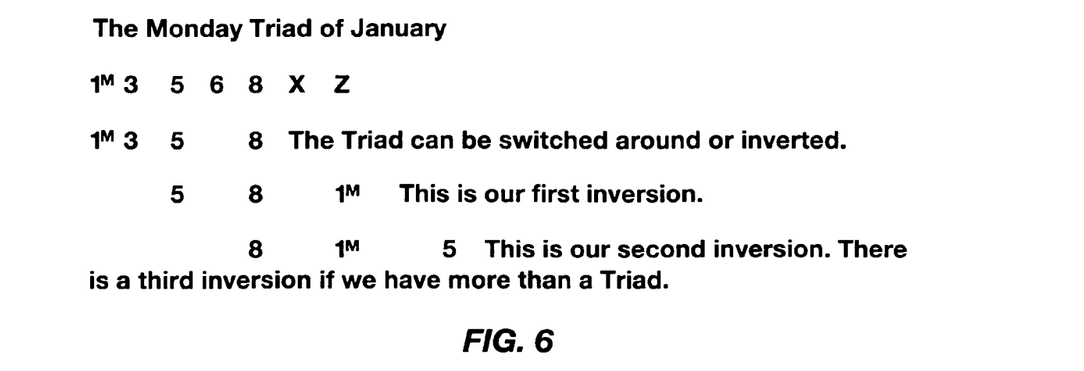
FIG. 6 is an illustration of the Monday Triad of January in accordance with the principles of the present disclosure.

Referring now to FIG. 6, a chord may be made from every other level 100 of a given scale 140. Using every other level of the seven scales of each month may provide seven main chords that can be used in the Key that the month is based upon, for example the key of January or the number 1. The chords may be named after the scales. The first three levels of a chord is called a Triad. Thus, a chord may be comprised of three levels, including every other level of the scale beginning with the first level. For example, in the Monday scale of January, the Triad is: Level 1, Level 5 and Level 8. This same every other level in the scale can be followed to come up with different chords. Further, the same pattern can be used for each scale, Monday through Saturday, in January. It will be appreciated that the same pattern may also be used for every one of the twelve notes, labeled as January through December.

It will be appreciated that the order of the Triad can then be switched around or inverted, meaning the first level of the Triad is changed to the last level of the Triad and all others simply move up one position. For example, in the Monday Triad of January, the first inversion is Level 5, Level 8 and Level 1, where Level 1 has been relocated to the last position or has become inverted. The second inversion in the Monday Triad of January, is Level 8, Level 1 and Level 5, where Level 5 has been relocated to the last position or has become inverted.

The present disclosure also utilizes a series of colors to represent different beats or a duration of a beat. Each color may represent a different beat and the beats may determine the duration that a particular structure, such as a piano key, is played. For example, the different beat colors represent a whole note, a half note, a quarter note, an eighth note, a sixteenth note, a thirty-second note and a sixty-fourth note. For example in one embodiment, the color magenta or purple may be used to represent a whole note or one beat; the color green may be used to represent a half note or two beats; the color blue may be used to represent a quarter note or four beats; the color red may be used to represent an eighth note or eight beats; the color gold may be used to represent a sixteenth note or sixteen beats; the color aqua or light blue may be used to represent a thirty second note or thirty-two beats; and the color orange may be used to represent a sixty forth note or sixty-four beats.

Further, a beat can be lengthened with another beat, represented by the symbol ➔, of the same or different color. The number zero may be used to represent a beat of silence or a rest. The duration of the rest may last for the length associated with a particular color. Rests can be extended with another rest using the symbol ➔ of any color.

Figure 7:
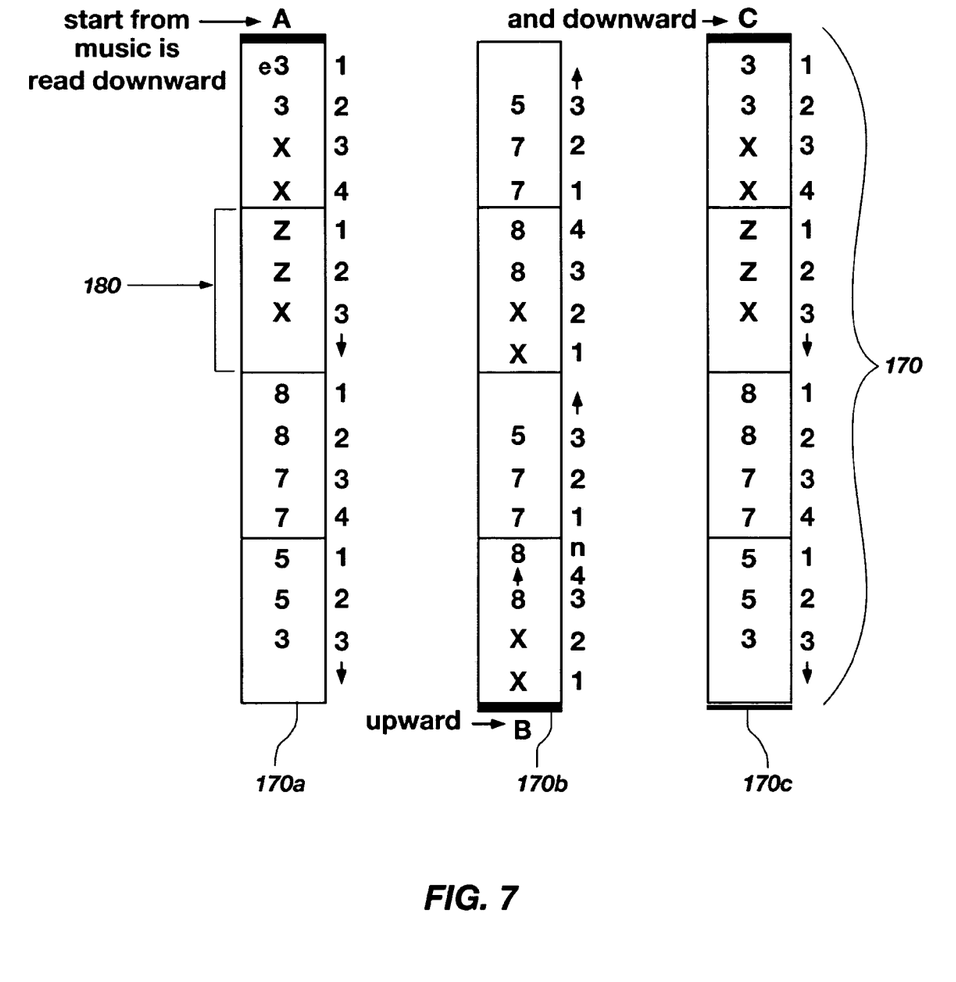
FIG. 7 is an illustration of how the music notation is read in an up and down manner in accordance with the principles of the present disclosure.
Figure 8:
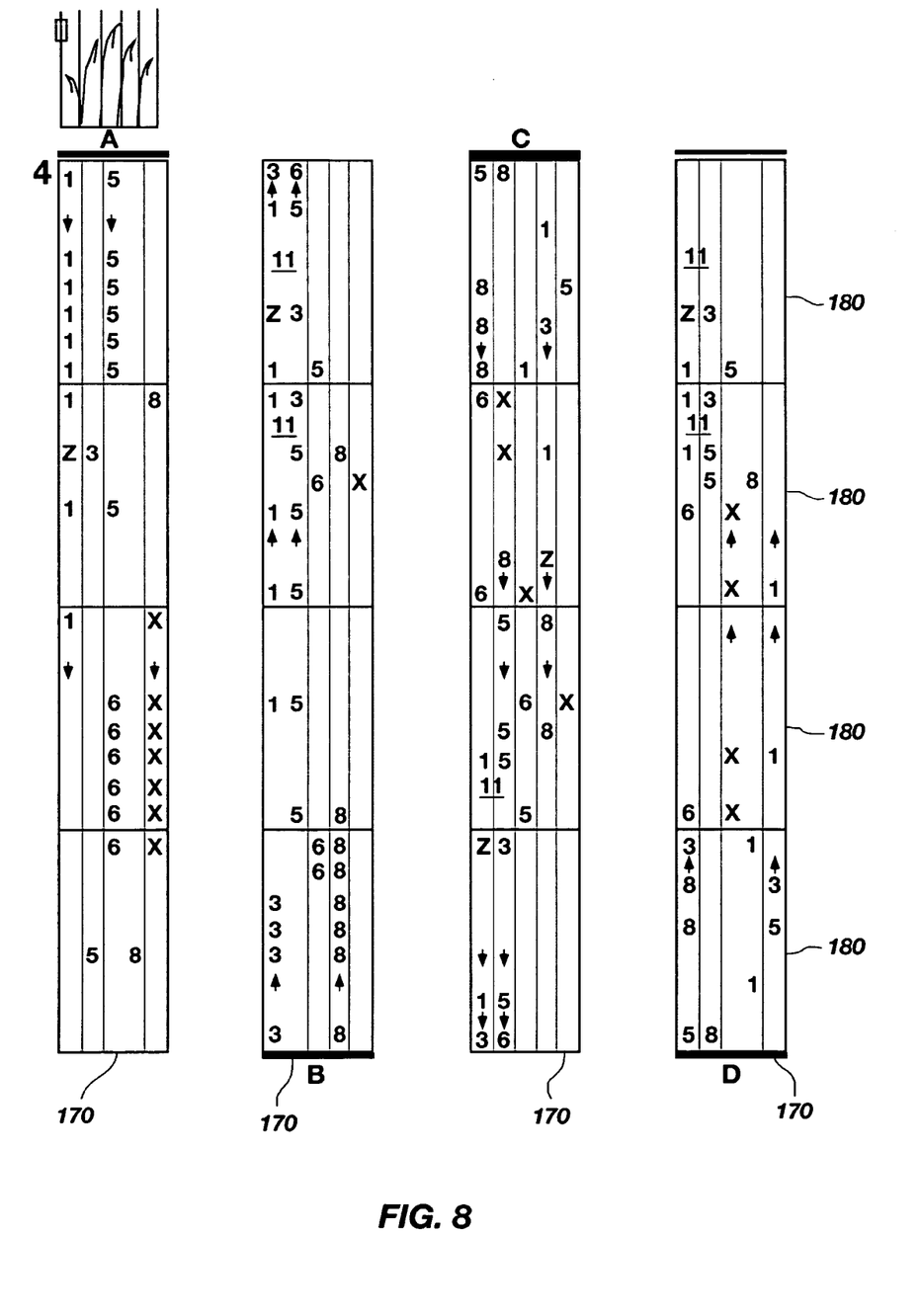
FIG. 8 is an illustration of the music notation and the fingering used in connection with the music notation in accordance with the principles of the present disclosure.
Figure 9:
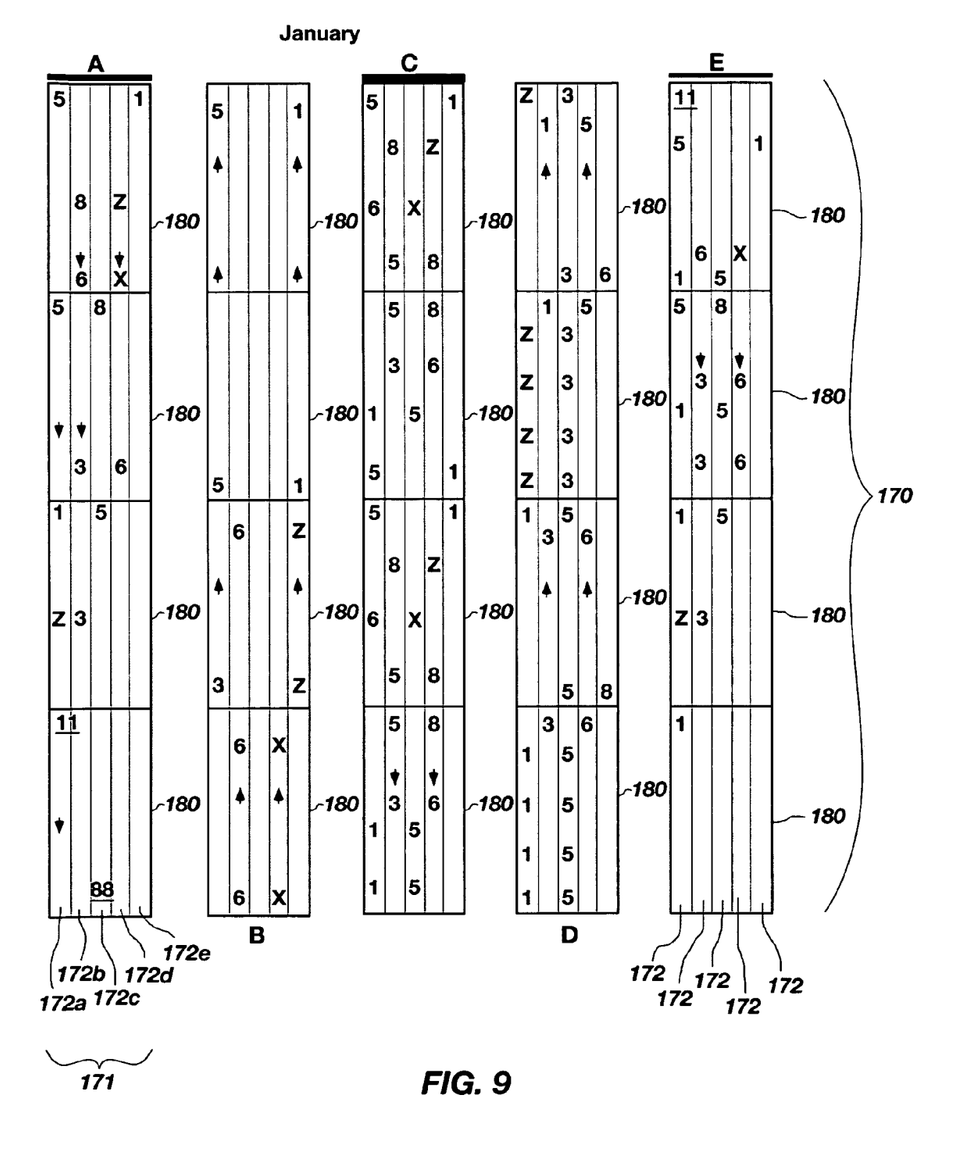
FIG. 9 is another illustration of the music notation for the key of January and the fingering used in connection with the music notation in accordance with the principles of the present disclosure.
Figure 10:
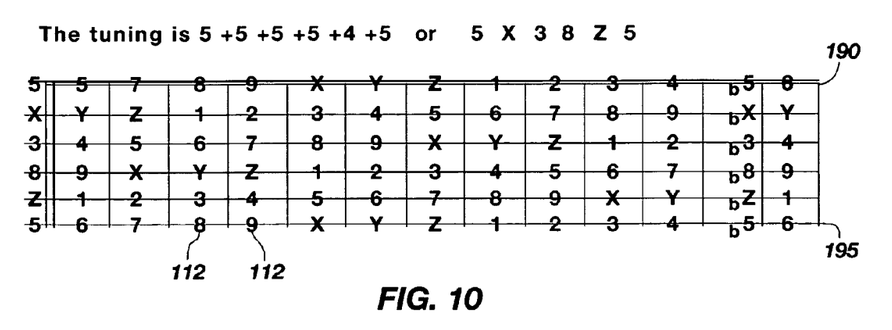
FIG. 10 is an illustration of how the music notation is read from a left to right manner in accordance with the principles of the present disclosure.

FIGS. 7-9 illustrate several examples of the music notation described above. The music notation of the present disclosure may also include a line 170, which may also be referred to herein as a column 170. The line 170 may be a plurality of columns, where each column corresponds with one line. The line or column 170 may comprise a plurality of sub-columns 172, as illustrated in FIGS. 8-10. For example, in one embodiment there are five sub-columns 172 per line 170 or per column. The sub-columns 172 may contain the alphanumeric notes or levels, as illustrated in FIGS. 9 and 10.

Further, the music notation may also include at least one box 180 (illustrated best in FIG. 7) that may be formed in each of the plurality of columns or lines 170. Each box 180 may include the plurality of sub-columns 172 as illustrated best in FIGS. 8-10. For example, each box 180 may be divided five different ways into five sub-columns 172. In this example, each sub-column 172 may represent a structure of the instrument, such as a piano key, for each finger to play a particular note or level. Each of the five sub-columns 172 may represent either a white key of a piano or a black key of a piano. It will be appreciated that there may be two boxes 180 placed side by side, one for each hand such that there may be a particular sub-column that corresponds to a particular finger on a particular hand. FIG. 8 illustrates the right hand fingers of a user and identifies the finger that is to play the note or level identified in a particular sub-column.

Each of the sub-columns 172 may identify a specific set and a specific number of the structure or level to be played by the user. The five sub-columns 172 of each box 180 may directly correspond to a specific finger of the user's hand. For example in FIG. 8, the right hand of a user plays the box 180 as follows: the first sub-column 172a located on the far left side of the line 171, may correspond with the numbered structure in the set that a user's thumb plays. The second sub-column 172b from the left side of the line 171, may correspond with the numbered structure in the set that the user's index finger plays. The third sub-column 172c from the left side of the line 171, may correspond with the numbered structure in the set that the user's middle finger plays. The fourth sub-column 172d from the left side of the line 171 in FIG. 9, may correspond with the numbered structure in the set that the user's ring finger plays. Finally, the fifth sub-column 172e from the left side of the line 171, may correspond with the numbered structure in the set that the user's pinky plays. The above example may be flip-flopped for a user's left hand, such that the user's thumb begins from the right side of the line 171 and moves toward the center in a similar manner as described above for the right hand.

The line 170 may be formed from a box 180 and typically a plurality of boxes 180. Additionally, as illustrated best in FIG. 7, the musical information or notation may be read from top of the line 170a to the bottom of the line 170a until the entire line 170a is read. At the end of one line 170a, the musical information or notation is then read in reverse order from bottom of the next line 170b to the top of that line 170b in an alternating pattern, until all lines 170a, 170b and 170c on a page are read and played.

Figure 11:
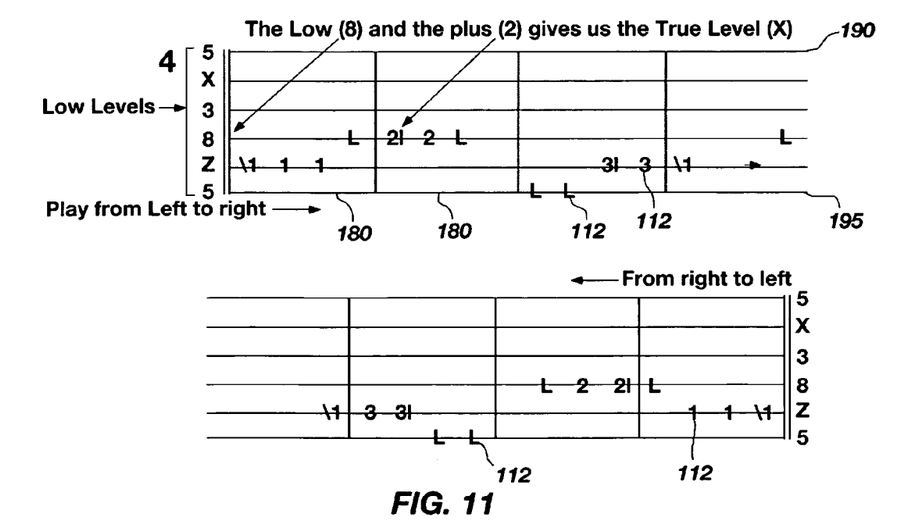
FIG. 11 is another illustration of the music notation in accordance with the principles of the present disclosure.

It will be appreciated that in an alternative embodiment for use with some instruments, for example a guitar, the numbers corresponding to notes in a given set may be read from left to right until a user reaches the end of a line, as illustrated in FIGS. 10-11. After the first line is read, then the user may read the notation from right to left for the second line in an alternating manner.

The music notation described herein is illustrated as being read from left to right, for example with a guitar, in FIGS. 10-11. In FIG. 10, the guitar is facing you as a mirror image and is shown with numbers up to the eleventh fret. The bass string is identified as the first, top line 190 and the small sixth string is the bottom most line 195 in FIG. 10. The tuning for FIG. 11, is as follows:

5 +5 +5 +5 +4 +5 OR 5 X 3 8 Z 5

For a right handed player, the present disclosure contemplates using the following notations to help a user determine the hand and playing finger to play a particular string as follows: an underscore symbol (i.e., _) may represent the thumb, a backslash symbol (i.e., \) may represent the index finger, a lower case "L" symbol (i.e., l) may represent the middle finger, an exclamation point symbol (i.e., !) may represent the ring finger, and a forward slash symbol (i.e., /) may represent the pinky finger, such that when the symbols are represented together they form a symbol that appears similar to a left hand fully extended with the palm of the hand facing the player (i.e., _∃l!/). For a left handed player, the symbols are simply switched opposite to form a right hand with the palm facing the reader (i.e., ∃!l/_).

An open string on a guitar may be represented as an a capital "L" (i.e., L) for low. Every level from the low is determined by a low plus some number. For example, a low may be the number ten, and consequently may be any of the twelve notes that may be numbered within a set, and the number low plus two may identify the true number, which in this case is ten or X in the music notation disclosed herein.

The present disclosure may also include a system for notating musical information, wherein the system may comprise a computer. It will be appreciated that the computer may include an input, an output and memory or storage containing computer readable code that may pertain or relate to musical information. The musical information may include the music notation disclosed herein, which may be displayed using the computer. It is to be understood that the input may include a single input or may include a plurality of inputs. Similarly, the output may include a single output or may include a plurality of outputs. The musical information may be displayed via the computer using a visual display unit. Further, the musical information may be input into the memory or computer readable storage using a sensor that monitors, scans for and accepts information from an external source.

An Input device may be any piece of computer hardware equipment used to provide data and control signals to an information processing system (such as a computer). Input and output devices may make up the hardware interface between a computer and the user or external world and may be any input or output hardware known or that may become known in the art within departing from the spirit or scope of the present disclosure.

Those having ordinary skill in the relevant art will appreciate the advantages provided by the features of the present disclosure. It is a potential feature of the present disclosure to provide a method of notating and teaching music that is simple in design and implementation. It is another potential feature of the present disclosure, in accordance with one aspect thereof, to provide a method for notating and teaching music using twelve symbols, including numbers, letters, and colors. It is yet another potential feature of the present disclosure to provide a method of notating, reading and playing music in a vertical orientation instead of a traditional horizontal orientation.

In the foregoing Detailed Description, various features of the present disclosure have been grouped together in a single embodiment for the purpose of streamlining the disclosure. This method of disclosure is not to be interpreted as reflecting an intention that the claimed disclosure requires more features than are expressly recited in each claim. Rather, inventive aspects may lie in less than all features of a single disclosed embodiment.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of notating music comprising the steps of:
providing a vertical music staff on a sheet medium, the staff providing columnar marking spaces or blocks, the columns of marking spaces or blocks delineated by vertical and horizontal lines, to create marking areas provided in the vertical staff for marking musical notes;
notating music notes for an instrument having a plurality of structures, keys or positions for producing sound;
dividing the plurality of structures, keys or positions into a plurality of sets of notes, wherein each set comprises at least one of the plurality of structures, keys or positions;
assigning a numerical value note name to each of the structures in a set, wherein the numerical value note name represents a musical pitch level;
repeating the step of assigning a numerical value name to each of the plurality of structures in a set for all sets of structures, keys or positions the instrument;
providing a plurality of columnar musical staffs per sheet medium, where notation proceeds from the top of the left most staff from the top to the bottom and continues at the bottom of second left most staff from the bottom to the top, proceeding to the right most column in an up then down pattern:
representing musical compositions by marking sequences of the assigned musical values in the columnar marking space per finger, according to which finger is to play which musical structure, key, or position according to a musical timing and sequence.

2. The method of claim 1, wherein the step of notating music notes includes defining a single set that consists of twelve structures, keys or positions corresponding to twelve pitch levels and each structure, keys or positions is numbered from one to twelve.

3. The method of claim 2, wherein the numbering of each structure, keys or positions corresponding to a single pitch level in a single set is repeated in each of the plurality of sets until all structures, keys or positions are numbered, such that an ending set may include less than twelve structures, keys or positions corresponding to and equal number of musical pitch levels.

4. The method of claim 2, wherein each of the twelve pitch levels in a single set is named after one of twelve months in a calendar year, wherein each pitch level has the same name in each of the plurality of sets, and wherein each of the plurality of sets is distinguished from the other sets by a letter in the alphabet.

5. The method of claim 2, wherein the step of notating music notes includes providing each of the plurality of sets with a low position that represents a first pitch level in a given set.

6. The method of claim 5, wherein each of the plurality of sets comprises a scale comprised of seven levels.

7. The method of claim 6, wherein the seven levels of the scale are separated into a first group and a second group, wherein the first group consists of three levels beginning with a chosen sound level that is a key and includes every other level until three levels are reached, wherein the first group is comprised of all even numbered levels if the key is an even number level or the first group is comprised of all odd numbered levels if the key is an odd number level.

8. The method of claim 7, wherein the second group consists of four levels, with the first of the four levels beginning with the level immediately following the third level of the first group and the four levels include every other level until four levels are reached, wherein the second group includes level numbers that are opposite the level numbers of the first group, such that the second group is comprised of all even numbered levels if the first group is comprised of all odd numbered levels and the second group is comprised of all odd numbered levels if the first group is comprised of all even numbered levels.

9. The method of claim 6, wherein each of the seven levels of the scale are named based on each of the levels position with respect to the other levels of the scale, wherein the first level is named Monday, the second level is named Tuesday, the third level is named Wednesday, the fourth level is named Thursday, the fifth level is named Friday, the sixth level is named Saturday, and the seventh level is named Sunday.

10. The method of claim 6, wherein a chord is three levels comprised of every other level of the scale beginning with the first level.

11. The method of claim 1, wherein the step of notating music notes includes displaying said music notation and text contained within a plurality of columns per display to a user, wherein displayed within each column of music notation and text is at least one box for each hand that a user needs to play music on the instrument.

12. The method of claim 11, wherein the music notation and text is read from top to bottom and then from bottom to top in alternating columns of music notation and text, displaying each box consisting of five sub-columns wherein each sub-column identifies a specific set and a specific number of the structure to be played by the user.

13. The method of claim 12, wherein the five sub-columns of each box directly correspond to a specific finger of the users hand, such that the first sub-column located on the far left side of the box corresponds with the numbered structure in the set that a user's pinky finger plays, the second sub-column from the left side of the box corresponds with the numbered structure in the set that the user's ring finger plays, the third sub-column from the left side of the box corresponds with the numbered structure in the set that the user's middle finger plays, the fourth sub-column from the left side of the box corresponds with the numbered structure in the set that the user's index finger plays and the fifth sub-column from the left side of the box corresponds with the numbered structure in the set that the user's thumb plays.

14. The method of claim 11, wherein the music notation is displayed in a visual display comprising a series of colors, wherein each color represents a different beat, wherein beats determine a duration the structure is played, wherein the different beat colors represent a whole note, a half note, a quarter note, an eighth note, a sixteenth note, a thirty-second note and a sixty-fourth note.

15. The method of claim 14, further comprising displaying a beat of silence as a rest that is represented in the music notation as the number zero.

16. The method of claim 15, wherein a note is extended to the duration of the color, wherein the extension is represented in the music notation as an arrow head.

17. The method of claim 5, wherein each of the twelve numbered levels comprises a position, wherein each of the positions are determined with respect to the low position.

18. The method of claim 17, wherein each of the twelve positions is determined as follows:
   a Low is the low position;
   an Up position is the low position plus one additional position;
   a Leap position is the low position plus two additional positions;
   a Minor position is the low position plus three additional positions;
   a Major position is the low position plus four additional positions;
   a Suspended position is the low position plus five additional positions;
   a Diminished position is the low position plus six additional positions;
   a High position is the low position plus seven additional positions;
   an Augmented position is the low position plus eight additional positions;
   a Relative Minor position is the low position plus nine additional positions;
   a Pull position is the low position plus ten additional positions; and
   a Down position is the low position plus eleven additional positions.

19. A system for notating musical note information comprising:
   a plurality of sets wherein each set comprises twelve notes corresponding to musical pitch levels;
   an alphanumeric symbol that is assigned to each of the twelve notes, wherein the alphanumeric symbol represents a musical pitch level;
   wherein each of the alphanumeric symbols correspond with a structure, key or position of a musical instrument within a given set;
   a vertical music staff on a sheet medium, the staff providing columnar marking spaces or blocks, the columns of marking spaces or blocks delineated by vertical and horizontal lines, to create marking areas provided in the vertical staff for marking musical notes;
   a plurality of columnar musical staffs per sheet medium, where notation proceeds from the top of the left most staff from the top to the bottom and continues at the bottom of second left most staff from the bottom to the top, proceeding to the right most column in an up then down pattern; and
   marked sequences of the assigned musical values in the columnar marking space per finger, according to which finger is to play which musical structure, key, or position according to a musical timing and sequence.

20. The system of claim 19, wherein the system further comprises a plurality of columns comprising a plurality of sub-columns, wherein the sub-columns contain the alphanumeric notes.

21. The system of claim 20, wherein the system comprises at least one box formed in each of the plurality of columns, wherein the at least one box comprises the plurality of sub-columns.

22. The system of claim 19, wherein the system further comprises at least one line of musical information comprising at least one box, and wherein the musical information is configured to be read from top to bottom and then the musical information is read from bottom to top for a next line.

23. The system of claim 22, wherein each box consists of five sub-columns and each sub-column identifies a specific set and a specific number of the structures key or position to be played by the user.

24. The system of claim 23, wherein the five sub-columns of each box directly correspond to a specific finger of the user's hand, such that the first sub-column located on the far left side of the box corresponds with the numbered structure, key or position in the set that a user's pinky finger plays, the second sub-column from the left side of the box corresponds with the numbered structure, key or position in the set that the user's ring finger plays, the third sub-column from the left side of the box corresponds with the numbered structure, key or position in the set that the user's middle finger plays, the fourth sub-column from the left side of the box corresponds with the numbered structure, key or position in the set that the user's index finger plays and the fifth sub-column from the left side of the box corresponds with the numbered structure in the set that the user's thumb plays.

25. The system of claim 19, wherein the twelve alphanumeric symbols are repeated in each of the plurality of sets of the instrument.

26. The system of claim 19, wherein each of the alphanumeric symbols in a single set is named after one of twelve months in a calendar year, and wherein each of the plurality of sets is distinguished from the other sets by a letter in the alphabet.

27. The system of claim 19, wherein each set comprises a low position that represents a first pitch level in that set, wherein the low position is a key that a particular piece of music is based upon.

28. The system of claim 27, wherein each of the plurality of sets comprises a scale comprised of seven levels.

29. The system of claim 28, wherein the seven levels of the scale are separated into a first group and a second group, wherein the first group consists of three levels beginning with the key and includes every other level until three levels are reached, wherein the first group is comprised of all even numbered levels if the key is an even number level or the first group is comprised of all odd numbered levels if the key is an odd number level.

30. The system of claim 29, wherein the second group consists of four levels, with the first of the four levels beginning with the level immediately following the third level of the first group and the four levels include every other level until four levels are reached, wherein the second group includes level numbers that are opposite the level numbers of the first group, such that the second group is comprised of all even numbered levels if the first group is comprised of all odd numbered levels and the second group is comprised of all odd numbered levels if the first group is comprised of all even numbered levels.

31. The system of claim 28, wherein each of the seven levels of the scale are named based on each of the levels position with respect to the other levels of the scale, wherein the first level is named Monday, the second level is named Tuesday, the third level is named Wednesday, the fourth level is named Thursday, the fifth level is named Friday, the sixth level is named Saturday, and the seventh level is named Sunday.

32. The system of claim 28, wherein a chord is three levels comprised of every other level of the scale beginning with the first level.

33. The system of claim 19, wherein the system comprises a series of colors, wherein each color represents a different beat, wherein beats determine a duration the structure, key or position is played, wherein the different beat colors represent a whole note, a half note, a quarter note, an eighth note, a sixteenth note, a thirty-second note and a sixty-fourth note.

34. The system of claim 19, wherein a beat of silence is a rest and is represented in the music notation as the number zero.

35. The system of claim 27, wherein each of the twelve numbered Levels comprises a position, wherein each of the positions are determined with respect to the low position.

36. The system of claim 35, wherein each of the twelve positions is determined as follows:
   a Low is the low position;
   an Up position is the low position plus one additional position;
   a Leap position is the low position plus two additional positions;
   a Minor position is the low position plus three additional positions;
   a Major position is the low position plus four additional positions;
   a Suspended position is the low position plus five additional positions;
   a Diminished position is the low position plus six additional positions;
   a High position is the low position plus seven additional positions;
   an Augmented position is the low position plus eight additional positions;
   a Relative Minor position is the low position plus nine additional positions;
   a Pull position is the low position plus ten additional positions; and
   a Down position is the low position plus eleven additional positions.

37. The system of claim 19, wherein the alphanumeric symbols are the numbers one, two, three, four, five, six, seven, eight, and nine and further include the letters X for the number ten, Y for the number eleven, and Z for the number twelve.

38. The system of claim 19, wherein for a left hand of a player, an underscore symbol (i.e., _) represents the player's thumb, a backslash symbol (i.e., \) represents the player's index finger, a lower case "L" symbol (i.e., l) represents the player's middle finger, an exclamation point symbol (i.e., !) represents the player's ring finger, and a forward slash symbol (i.e., /) represents the player's pinky finger, such that when the symbols are represented together they form a symbol that is a left hand fully extended with the palm facing the player (i.e., _\l!/).

39. The system of claim 19, wherein the twelve alphanumeric symbols are repeated in each of the plurality of sets of the instrument;
   wherein each of the alphanumeric symbols in a single set is named after one of twelve months in a calendar year, and wherein each of the plurality of sets is distinguished from the other sets by a letter in the alphabet;
   wherein each of the twelve numbered levels comprises a position, wherein each of the positions are determined with respect to the low position;
   wherein each of the twelve positions is determined as follows:
      a Low is the low position;
      an Up position is the low position plus one additional position;
      a Leap position is the low position plus two additional positions;
      a Minor position is the low position plus three additional positions;
      a Major position is the low position plus four additional positions;
      a Suspended position is the low position plus five additional positions;
      a Diminished position is the low position plus six additional positions;
      a High position is the low position plus seven additional positions;
      an Augmented position is the low position plus eight additional positions;
      a Relative Minor position is the low position plus nine additional positions;
      a Pull position is the low position plus ten additional positions; and
      a Down position is the low position plus eleven additional positions;
   a plurality of columns comprising a plurality of sub-columns, wherein the sub-columns contain the alphanumeric notes;
   at least one box formed in each of the plurality of columns, wherein the at least one box comprises the plurality of sub-columns;
   at least one line comprising at least one box, and wherein the musical information is read from top to bottom until an entire line is read and then the musical information is read from bottom to top for the next line, thereby alternating reading of the columns on a page;
   wherein each box comprises five sub-columns and each sub-column identifies a specific set and a specific number of the structure, key or position to be played by the user;
   wherein the five sub-columns of each box directly correspond to a specific finger of the user's hand, such that the first sub-column located on the far left side of the box corresponds with the numbered structure, key or position in the set that a user's pinky finger plays, the second sub-column from the left side of the box corresponds with the numbered structure, key or position in the set that the user's ring finger plays, the third sub-column from the left side of the box corresponds with the numbered structure, key or position in the set that the user's middle finger plays, the fourth sub-column from the left side of the box corresponds with the numbered structure, key or position in the set that the user's index finger plays and the fifth sub-column from the left side of the box corresponds with the numbered structure, key or position in the set that the user's thumb plays;

wherein each of the plurality of sets comprises a low position that represents a first pitch level in that set, wherein the low position is a key that a particular piece of music is based upon;

wherein each of the plurality of sets comprises a scale comprised of seven levels;

wherein the seven levels of the scale are separated into a first group and a second group, wherein the first group consists of three levels beginning with the key and includes every other level until three levels are reached, wherein the first group is comprised of all even numbered levels if the key is an even number level or the first group is comprised of all odd numbered levels if the key is an odd number level;

wherein the second group consists of four levels, with the first of the four levels beginning with the level immediately following the third level of the first group and the four levels include every other level until four levels are reached, wherein the second group includes level numbers that are opposite the level numbers of the first group, such that the second group is comprised of all even numbered levels if the first group is comprised of all odd numbered levels and the second group is comprised of all odd numbered levels if the first group is comprised of all even numbered levels;

wherein each of the seven levels of the scale are named based on each of the levels position with respect to the other levels of the scale, wherein the first level is named Monday, the second level is named Tuesday, the third level is named Wednesday, the fourth level is named Thursday, the fifth level is named Friday, the sixth level is named Saturday, and the seventh level is named Sunday;

a chord comprised of three levels, including every other level of the scale beginning with the first level;

a series of colors, wherein each color represents a different beat, wherein beats determine a duration the structure, key or position is played, wherein the different beat colors represent a whole note, a half note, a quarter note, an eighth note, a sixteenth note, a thirty-second note and a sixty-fourth note; and wherein a beat of silence is a rest and is represented in the music notation as the number zero.

40. A system for notating musical information comprising:

a computer comprising an input, an output and memory containing computer readable code pertaining to musical information, wherein the musical information comprises:

a plurality of sets, wherein each set comprises twelve notes each note corresponding to a musical pitch level;

an alphanumeric symbol that is assigned to each of the twelve notes, wherein the alphanumeric symbol represents the musical pitch level;

a vertical music staff on a sheet medium, the staff providing columnar marking spaces or blocks, the columns of making spaces or blocks delineated by vertical and horizontal lines, to create marking areas provided in the vertical staff for marking musical notes;

a plurality of columnar musical staffs per sheet medium, where notation proceeds from the top of the left most staff from the top to the bottom and continues at the bottom of second left most staff from the bottom to the top, proceeding to the right most column in an up then down pattern; and marked sequences of the assigned musical values in the columnar marking space per finger, according to which finger is to play which musical structure, key, or position according to a musical timing and sequence.

41. The system of claim 40, wherein the input comprises a plurality of inputs.

42. The system of claim 40, wherein the output comprises a plurality of outputs.

43. The system of claim 40, wherein the musical information is displayed using a visual display unit.

44. The system of claim 40, wherein the musical information is input into the computer readable storage using a sensor that monitors, scans for and accepts information from an external source.

* * * * *